United States Patent Office 3,651,175
Patented Mar. 21, 1972

3,651,175
POLYVINYL CHLORIDE RESIN COMPOSITION HAVING EXCELLENT IMPACT RESISTANCE AND WEATHERABILITY
Fumio Ide, Ohtake-shi, and Masanobu Miura, Ramaguchi-ken, Japan, assignors to Mitsubishi Rayon Co., Ltd., Tokyo, Japan
No Drawing. Filed Nov. 9, 1970, Ser. No. 88,233
Claims priority, application Japan, Nov. 7, 1969, 44/89,180
Int. Cl. C08f 29/24, 41/12, 45/24
U.S. Cl. 260—876 R
11 Claims

ABSTRACT OF THE DISCLOSURE

A polyvinyl chloride resin composition having excellent impact resistance and weatherability can be obtained by blending 100 parts by weight of a vinyl chloride polymer with 5 to 80 parts by weight of a resin which comprises 20 to 80 parts by weight of a core-crust structural crosslinked polyalkyl acrylate elastomer (A) and 80 to 20 parts by weight of a polymer (B) obtained by polymerization of a vinyl monomer or a mixture thereof, at least a part of the monomer for a polymer (B) being graft-polymerized in the presence of elastomer (A), elastomer (A) being obtained by the steps of dissolving an organic peroxide having a decomposition temperature higher than 60° C. in a monomer comprising 80 to 100% by weight of at least one alkyl acrylate whose alkyl group has 1 to 10 carbon atoms and 0 to 20% by weight of a vinyl monomer, polymerizing said monomer in an aqueous solution containing a water soluble redox initiator and an emulsifier at a temperature lower than the decomposition temperature of said organic peroxide to obtain an elastomer latex, heating and stirring said elastomer latex at a temperature higher than the decomposition temperature of said organic perioxide to obtain a crosslinked elastomer latex, adding to a latex containing 100 parts by weight of said crosslinked elastomer 30 to 150 parts by weight of a monomer which comprises 80 to 100% by weight of at least one alkyl acrylate whose alkyl group has 1 to 10 carbon atoms and 0 to 20% by weight of a vinyl monomer and in which an organic peroxide having a decomposition temperature higher than 60° C. is dissolved, seed polymerizing the monomer with a water soluble redox initiator at a temperature lower than 60° C. in the presence of said latex containing crosslinked elastomer and heating the thus obtained latex to a temperature higher than 60° C.

---

This invention relates to a resin composition mainly comprising a polyvinyl chloride resin and having excellent impact resistance and weatherability.

Polyvinyl chloride resin is widely used because of its low price and excellent physical and chemical properties, but it is somewhat inferior in impact resistance, heat resistance and cold resistance.

There are methods for improving said drawbacks. For example, the impact resistance of polyvinyl chloride resin is improved by blending a rubbery elastomer or an impact resistant resin having the rubbery elastomer as a substrate. According to the typical example of such methods, a resin obtained by graft-polymerizing styrene, acrylonitrile or methyl methacrylate onto a diene elastomer, such as acrylonitrile-butadiene-styrene resin (hereinafter referred to as ABS resin) or methyl methacrylate-butadiene-styrene resin (hereinafter referred to as MBS resin) is blended with vinyl chloride resin.

The composition obtained by such method is extremely improved in its impact resistance and cold resistance, but has a substantial disadvantage of poor weatherability because the elastomer contains double bond. In order to improve the weatherability, it has been proposed to substitute a saturated elastomer containing no double bond for said diene elastomer. However, no saturated elastomer has been found which has enough compatibility with polyvinyl chloride resin and which exhibits the same impact resistance as in case of using the diene elastomer. For example, as an elastomer vinyl acetate-ethylene copolymer or chlorinated polyethylene has been used for obtaining an impact resistant polyvinyl chloride resin composition having good weatherability. However, the impact resistance of the thus obtained polyvinyl chloride resin composition is not satisfactory and furthermore mechanical and thermal properties which are intrinsic to polyvinyl chloride resins are reduced.

When acrylic ester elastomers obtained by the usually known polymerization method are used, little improvement is attained in impact resistance and moreover molding processability of the composition is markedly reduced. This is because polyacrylic esters obtained by the usual polymerization method have crosslinked structure with difficulty and hence are apt to deform when subjected to physical changes of heat, pressure, etc., whereby orientation and strain are caused at molding.

We have made researches on production of a polyvinyl chloride resin composition having excellent weatherability and impact resistance when a saturated elastomer is used as an elastomer component. As the result, we have found a method for producing a core-crust structural crosslinked polyalkyl acrylate elastomer which is a kind of saturated elastomer and, by using that core-crust structural crosslinked elastomer, we have succeeded in producing a composition which has excellent weatherability as well as impact resistance which equals to that of a composition which is obtained by using a diene elastomer.

This invention relates to a vinyl chloride resin composition having excellent impact resistance and weatherability, which is obtained by blending 100 parts by weight of a vinyl chloride polymer with 5 to 80 parts by weight of a resin which comprises 20 to 80 parts by weight of core-crust structural crosslinked polyalkyl acrylate elastomer (A) and 80 to 20 parts by weight of a polymer (B) obtained by polymerization of a vinyl monomer or a mixture thereof, at least a part of the monomer for the polymer (B) being graft-polymerized in the presence of elastomer (A), which is obtained by the steps of dissolving an organic peroxide having a decomposition temperature higher than 60° C. in a monomer comprising 80 to 100% by weight of at least one alkyl acrylate whose alkyl group has 1 to 10 carbon atoms and 0 to 20% by weight of a vinyl monomer, polymerizing said monomer in an aqueous solution containing a water soluble redox initiator and an emulsifier at a temperature lower than 60° C. to obtain an elastomer latex, heating and stirring the thus obtained latex at a temperature higher than 60° C. to obtain a crosslinked elastomer latex, adding to a latex containing 100 parts by weight of the crosslinked elastomer 30 to 150 parts by weight of a monomer which comprises 80 to 100% by weight of at least one alkyl acrylate, whose alkyl group has 1 to 10 carbon atoms and 0 to 20% by weight of a vinyl monomer and in which an organic peroxide having a decomposition temperature higher than 60° C. is dissolved, seed-polymerizing the monomer using a water soluble redox initiator at a temperature lower than 60° C. in the presence of said latex containing the crosslinked elastomer and further heating the thus obtained latex to a temperature higher than 60° C.

The polyvinyl chloride resin compositions of the invention preferably comprise a mixture of 100 parts by weight of a vinyl chloride polymer and 5 to 80 parts by weight of a resin (I); said resin comprising:

(a) 20 to 80 parts by weight of a core-crust structural crosslinked polyalkyl acrylate elastomer (A) and (b) 80 to 20 parts by weight of a polymer (B) obtained by the polymerization of at least one vinyl monomer selected from the group consisting of vinyl mononuclear aromatic hydrocarbons selected from the group consisting of styrene and α-methyl styrene; vinyl cyanides selected from the group consisting of acrylonitrile and methacrylonitrile; lower alkyl acrylates selected from the group consisting of methyl methacrylate, ethylmethacrylate, propylmethacrylate, and butylmethacrylate; lower alkyl vinyl ethers selected from the group consisting of methylvinyl ether, ethylvinyl ether, propylvinyl ether and butylvinyl ether; and lower alkyl vinyl ketones selected from the group consisting of methylvinyl ketone, ethylvinyl ketone, propylvinyl ketone and butylvinyl ketone, at least a part of said vinyl monomer being graft-polymerized in the presence of said elastomer (A); said elastomer (A) being prepared by the steps of:

(1) Providing a vinyl monomer having dissolved therein an organic peroxide having a decomposition temperature higher than 60° C., said vinyl monomer comprising:

(a) 80 to 100% by weight of at least one alkyl acrylate, the alkyl group of which having 1 to 10 carbon atoms, and (b) 0 to 20% by weight of a second vinyl monomer selected from the group consisting of vinyl mononuclear aromatic hydrocarbons selected from the group consisting of styrene and α-methyl styrene; vinyl cyanides selected from the group consisting of acrylonitrile and methacrylonitrile; lower alkyl acrylates selected from the group consisting of methyl methacrylate, ethylmethacrylate, propylmethacrylate, and butylmethacrylate; lower alkyl vinyl ethers selected from the group consisting of methylvinyl ether, ethylvinyl ether, propylvinyl ether and butylvinyl ether; and lower alkyl vinyl ketones selected from the group consisting of methylvinyl ketone, ethylvinyl ketone, propylvinyl ketone and butylvinyl ketone;

(2) Polymerizing said vinyl monomer at a temperature below 60° C. in an aqueous solution containing a water soluble redox initiator to obtain an elastomer latex;

(3) Heating and stirring said latex at a temperature higher than 60° C. to obtain a crosslinked elastomer latex corresponding to the core portion of said elastomer (A);

(4) Adding to a latex, containing 100 parts by weight of said crosslinked elastomer, 30 to 150 parts by weight of a vinyl monomer having dissolved therein an organic peroxide having a decomposition temperature of higher than 60° C.; said vinyl monomer comprising:

(a) 80 to 100% by weight of at least one alkyl acrylate, the alkyl group of which has 1 to 10 carbon atoms, and (b) 0 to 20% of said second vinyl monomer;

(5) Seed polymerizing said vinyl monomer with a water soluble redox initiator at a temperature below 60° C.; and (6) Heating the resulting latex to a temperature above 60° C., thereby surrounding the core portion of the elastomer with a crust portion and forming the core-crust structural crosslinked polyalkyl acrylate elastomer (A).

By the term "core-crust structural crosslinked polyalkyl acrylate elastomer" is meant an elastomer obtained by adding a monomer mainly composed of an acrylic ester to a crosslinked acrylate elastomer which constitutes a core, seed-polymerizing the monomer and furthermore crosslinking the thus obtained elastomer.

Said core-crust structural crosslinked polyalkyl acrylate elastomer is synthesized as follows.

0.1 to 5% by weight of an organic peroxide (e.g., benzoyl peroxide) having a decomposition temperature higher than 60° C. is dissolved in a monomer composed of more than 80% by weight of an acrylic ester and less than 20% by weight of a vinyl monomer. The thus obtained mixture is added to an aqueous solution containing an emulsifier and a water soluble redox initiator (e.g., potassium persulfate-sodium bisulfite) and the mixture is emulsion-polymerized at a temperature lower than 60° C., preferably 35° to 45° C. The monomer is polymerized in several hours, but said organic peroxide is hardly decomposed and is homogeneously distributed in polymer particles. Then, thus obtained latex is stirred with heating at a temperature higher than 60° C., preferably higher than 70° C. to cause crosslinking in particle state of the elastomer.

To the thus obtained latex containing 100 parts by weight of the crosslinked elastomer is added 30 to 150 parts by weight of a monomer composed of or mainly composed of an acrylic ester in which 0.1 to 5% by weight of an organic peroxide is dissolved. Thus obtained mixture is emulsion polymerized without addition of further emulsifier and with addition of an aqueous solution containing water soluble redox initiator at a temperature lower than 60° C., preferably 35° to 45° C. The monomer is polymerized in several hours, but the organic peroxide is hardly decomposed and homogeneously distributed in polymer particles. Thus obtained latex is stirred with heating to a temperature higher than 60° C. to cause crosslinking, thereby to obtain a core-crust structural crosslinked polyalkyl acrylate elastomer (A). Better result is obtained when the inside part (core) of the elastomer (A) is harder than the outside part (crust) thereof.

Illustrative of the vinyl monomer copolymerized with the acrylic esters are vinyl aromatic hydrocarbons, vinyl cyanides, alkyl methacrylates, vinyl ethers, vinyl ketones, etc.

The organic peroxides which may be used for crosslinking are required to meet the following conditions.

(1) They have a decomposition temperature higher than 60° C.

(2) They are soluble in said acrylic ester monomers, but insoluble in water.

(3) They are difficulty subjected to rapid induced decomposition with propagation polymer radical.

Examples of the organic peroxides which meet the above conditions are lauroyl peroxides, octanoyl peroxides, cyclohexanone peroxide, benzoyl peroxide, p-chlorobenzoyl peroxide, dicumyl peroxide, di-tertiary butyl peroxide, etc.

The redox initiators used in polymerization are required to be water soluble and not to be oil soluble. Especially such a reducing agent that accelerates the decomposition of the peroxide in the monomer is not suitable. Preferable redox initiators include potassium persulfate-sodium bisulfite, potassium persulfate-sodium thiosulfate, ammonium persulfate-sodium bisulfite, etc.

To thus obtained core-crust structural crosslinked polyalkyl acrylate elastomer (A) latex, are added one or more vinyl monomers which provide a hard and brittle resin upon polymerization, radical polymerization initiator and a chain transfer, and the added monomers are polymerized in one step or two steps to obtain a graft copolymer.

Furthermore, the thus obtained graft copolymer and a polymer obtained by independently polymerizing said one or more vinyl monomers with addition of a radical polymerization initiator and a chain transfer may be mixed (for example, in latex form) to obtain desired graft-blend type resin.

In both cases of the graft copolymer and the graft-blend type resin, the content of the elastomer is required to be 20 to 80% by weight.

As the vinyl monomers used, there are, for example, vinyl aromatic hydrocarbons, vinyl cyanides, alkyl methacrylates, vinyl ethers, vinyl ketones, etc.

The vinyl chloride polymers which are one component of the composition of this invention are vinyl chloride polymer or copolymers mainly composed of vinyl chloride having a mean degree of polymerization of 500 to 2,000, preferably of 700 to 1,500 or those which are chlorinated afterwards.

Any means such as hot roll, Banbury mixer, or extruder which are used for attaining homogeneous mixing may be used for mixing the graft copolymer or graft-blend type copolymer with the vinyl chloride polymer. At this time, the usually employed stabilizers, antioxidants, lubricants, fillers, pigments, etc. may be added optionally.

The thus obtained composition of this invention has excellent characteristics such as high impact resistance and weatherability and, therefore, may be successfully used even as working materials in such a field that usual polyvinyl chloride cannot be used. Furthermore, the composition of this invention is superior to the conventional impact resistant polyvinyl chloride compositions in weatherability and hence may be used outdoors. For example, they are suitable as raw materials for pipes, construction materials, etc.

The following examples are given by way of specifically illustrating this invention and are not intended to be construed as limiting in any sense. In these examples, percentages and parts are given by weight.

EXAMPLE 1

Preparation of crosslinked polyacrylate (A-1)

| | Parts |
|---|---|
| n-Butylacrylate (BuA) | 85 |
| Methylmethacrylate (MMA) | 15 |
| Benzoyl peroxide (BPO) | 1.5 |
| Sodium lauryl sulfate | 3 |
| Potassium persulfate (KPS) | 0.3 |
| Sodium bisulfite (NaHSO$_3$) | 0.3 |
| Deionized water | 200 |

In accordance with the above compositions, firstly, BPO was dissolved in the monomers. Thus obtained mixture was added to an aqueous solution containing emulsifier (sodium lauryl sulfate), KPS, and NaHSO$_3$ and the monomers were polymerized with stirring under a nitrogen atmosphere at 40° C. for 4 hours. Thereafter, the thus obtained solution was stirred and heated to 90° C. for 4 hours to obtain a core portion of elastomer (A-1) latex, which had been crosslinked in a latex state.

Preparation of a core-crust structural crosslinked elastomer (A-1)

| | Parts |
|---|---|
| A-1 latex (as solid) | 50 |
| n-Butyl acrylate | 50 |
| BPO | 0.75 |
| KPS | 0.15 |
| NaHSO$_3$ | 0.15 |
| Deionized water | 100 |

In the same manner as the case of preparation of the A-1) polymerization was carried out with KPS-NaHSO$_3$ initiator at 40° C. for 4 hours without further adding emulsifier, and furthermore crosslinking was effected with BPO by heating at 90° C. for 4 hours. The thus obtained core-crust structural crosslinked polyalkyl acrylate (A-1) had a gel content of 95% and a swelling index in toluene of 7.2.

Preparation of graft copolymer (G-1)

| | Parts |
|---|---|
| A-1 latex (as solid) | 40 |
| Styrene | 24 |
| Cumene hydroperoxide | 0.072 |
| Dextrose | 0.4 |
| Sodium pyrophosphate | 0.2 |
| Sodium soap of rosin | 0.8 |
| Ferrous sulfate | 0.002 |
| Deionized water | 40 |

A mixture having the above components was graft copolymerized at 60° C. for 4 hours. After completion of the polymerization, the following composition was added to the product and the mixture was graft copolymerized at 60° C. for 4 hours.

| | Parts |
|---|---|
| Methyl methacrylate | 24 |
| Acrylonitrile | 12 |
| Cumene hydroperoxide | 0.108 |
| Dextrose | 0.6 |
| Sodium pyrophosphate | 0.3 |
| Sodium soap of rosin | 1.2 |
| Ferrous sulfate | 0.003 |
| Deionized water | 60 |

After completion of the reaction, the reaction product was coagulated in dilute sulfuric acid and washed with water and dried to obtain powdery graft copolymer. 15 parts of said graft copolymer, 100 parts of polyvinyl chloride resin (TK-1000 manufactured by Shinetsu Kagaku Co., Ltd.), 3 parts of dibutyl tin maleate, 1 part of barium stearate and 0.5 part of stearic acid were blended by Henschel mixer and then the mixture was extruded by an extruder into a sheet, which was kept at 180° C. and 200 kg./cm.$^2$ for 10 minutes and then pressure molded. The properties of the thus molded product were as follows:

Sharpy impact strength [1]—65.5 kg.-cm./cm.$^2$
Tensile strength [2]—492 kg./cm.$^2$
Vicat softening point [3]—84.6° C.

[1] Measured according to ASTM D256–56 (test piece: 90 x 15 x 5 mm., V-notched, depth 2 mm.).
[2] Measured according to ASTM D638–58T (1 mm. in thickness) at 20° C. at a rate of 5 cm./min.
[3] Measured according to ASTM D1525–58T (test piece of 3 mm. in thickness).

EXAMPLES 2–10

Compositions as shown in Table 1 were obtained in the same manner as in Example 1.

As is clear from Table 1, the compositions using an elastomer having core-crust structure are extremely superior to those shown in comparative Example 1 using an elastomer having no core-crust structure in impact resistance. Furthermore, as shown in comparative Examples 2–4, no effects are attained unless when imparting core-crust structure, both crust and core are crosslinked as in this invention.

Furthermore, it is clear that the composition of this invention has excellent impact resistance without reducing tensile strength and lowering softening point of vinyl chloride resin as compared to the case of using chlorinated polyethylene or vinyl acetate-ethylene-vinyl chloride grafted copolymer.

TABLE 1

| Ex. No. | No. | Elastomer part - Core part - Monomer composition | Core part BPO percent comonomer | Crust part Monomer composition | Crust part BPO percent comonomer | Resin part 1st stage monomer composition | Resin part 2nd stage monomer composition | Modifier parts to PVC resin 100 parts | Sharpy impact strength (kg.-cm./cm.²) | Tensile strength (kg./cm.²) | Vicat softening point (°C.) |
|---|---|---|---|---|---|---|---|---|---|---|---|
| 1 | A-1 | BuA/MMA=17/3 | 1.5 | BuA=20 | 1.5 | St=24 | MMA/AN=24/12 | 15 | 65.5 | 492 | 84.6 |
| 2 | A-2 | BuA/MMA=17/3 | 1.5 | 2EHA=20 | 1.5 | St=24 | MMA/AN=24/12 | 15 | 68.5 | 487 | 85.0 |
| 3 | A-3 | 2EHA/MMA=17/3 | 1.5 | 2EHA=20 | 1.5 | St=24 | MMA/AN=24/12 | 15 | 57.2 | 491 | 84.7 |
| 4 | A-4 | 2EHA/MMA=17/3 | 1.5 | BuA=20 | 1.5 | St=24 | MMA/AN=24/12 | 15 | 57.8 | 479 | 84.3 |
| 5 | A-1 | BuA/MMA=17/3 | 1.5 | BuA=20 | 1.5 | AN/St=15/45 |  | 15 | 25.7 | 488 | 84.5 |
| 6 | A-1 | BuA/MMA=17/3 | 1.5 | BuA=20 | 1.5 | St=24 | MMA=36 | 15 | 44.5 | 486 | 84.3 |
| 7 | A-1 | BuA/MMA=17/3 | 1.5 | BuA=20 | 1.5 | MMA/AN=40/20 |  | 15 | 21.6 | 495 | 84.6 |
| 8 | A-1 | BuA/MMA=17/3 | 1.5 | BuA=20 | 1.5 | St=24 | MMA/AN=24/12 | 5 | 11.2 | 532 | 84.0 |
| 9 | A-1 | BuA/MMA=17/3 | 1.5 | BuA=20 | 1.5 | St=24 | MMA/AN=24/12 | 10 | 25.5 | 515 | 84.2 |
| 10 | A-1 | BuA/MMA=17/3 | 1.5 | BuA=20 | 1.5 | St=24 | MMA/AN=24/12 | 20 | 80 | 468 | 84.7 |
| 1¹ | a-1 | BuA/MMA=34/6 | 1.5 |  |  | St=24 | MMA/AN=24/12 | 15 | 8.7 | 482 | 84.5 |
| 2¹ | AB-5 | BuA/MMA=34/6 | 1.5 | BuA=20 | 0 | St=24 | MMA/AN=24/12 | 15 | 9.2 | 485 | 84.5 |
| 3¹ | AB-6 | BuA/MMA=34/6 | 0 | BuA=20 | 1.5 | St=24 | MMA/AN=24/12 | 15 | 6.5 | 483 | 84.3 |
| 4¹ | AB-7 | BuA/MMA=34/6 | 0 | BuA=20 | 0 | St=24 | MMA/AN=24/12 | 15 | 5.2 | 488 | 84.2 |
| 5¹ | Polyvinyl chloride resin |  |  |  |  |  |  |  | 3.2 | 565 | 84.0 |
| 6¹ | Vinylacetate-ethylene-vinylchloride graft copolymer |  |  |  |  |  |  | 15 | 11.8 | 411 | 82.2 |
| 7¹ | Chlorinated polyethylene (Cl content, 35 wt. percent) |  |  |  |  |  |  | 15 | 24.0 | 402 | 82.0 |

¹ Comparative.

NOTE.—BuA=n-butylacrylate; AN=acrylonitrile; 2EHA=2-ethylhexylacrylate; St=styrene; MMA=methyl methacrylate; BPO=benzoylperoxide.

EXAMPLES 11-12

Preparation of graft copolymer (G-1)

| | Parts |
|---|---|
| A-1 latex (as solid) | 70 |
| Styrene | 12 |
| Cumene hydroperoxide | 0.036 |
| Dextrose | 0.20 |
| Sodium pyrophosphate | 0.10 |
| Sodium soap of rosin | 0.40 |
| Ferrous sulfate | 0.001 |
| Deionized water | 20 |

The above composition was graft copolymerized at 60° C. for 4 hours. After completion of the reaction, the following composition was added to the above copolymer and the mixture was graft copolymerized at 60° C. for 4 hours to obtain a graft copolymer (G-1).

| | Parts |
|---|---|
| Methyl methacrylate | 12 |
| Acrylonitrile | 6 |
| Cumene hydroperoxide | 0.054 |
| Dextrose | 0.30 |
| Sodium pyrophosphate | 0.15 |
| Sodium soap of rosin | 0.60 |
| Ferrous sulfate | 0.0015 |
| Deionized water | 30 |

Preparation of resin (C-1) for blend

| | Parts |
|---|---|
| Styrene | 40 |
| Cumene hydroperoxide | 0.12 |
| t-Dodecyl mercaptan | 0.16 |
| Dextrose | 0.67 |
| Sodium pyrophosphate | 0.33 |
| Sodium soap of rosin | 1.2 |
| Ferrous sulfate | 0.0033 |
| Deionized water | 60 |

The above composition was polymerized at 60° C. for 3 hours. After completion of the reaction, the following composition was added to thus obtained polymer and the mixture was graft copolymerized at 60° C. for 3 hours to obtain a copolymer for blend.

| | Parts |
|---|---|
| Methyl methacrylate | 40 |
| Acrylonitrile | 20 |
| t-Dodecyl mercaptan | 0.24 |
| Cumene hydroperoxide | 0.18 |
| Dextrose | 1.0 |
| Sodium pyrophosphate | 0.5 |
| Sodium soap of rosin | 1.8 |
| Ferrous sulfate | 0.005 |
| Deionized water | 90 |

Preparation of graft-blend type copolymer 100 parts of G-1 latex and 75 parts of C-1 latex were homogeneously mixed in latex form. The mixture was coagulated in dilute sulfuric acid and washed with water and dried to obtain powdery graft-blend type copolymer (GB-1).

Similarly, 100 parts of G-1 latex and 100 parts of C-1 latex were blended to obtain GB-2.

Preparation of resin composition 15 parts of the graft-blend type copolymer, 100 parts of polyvinyl chloride, 3 parts of dibutyl tin maleate, 1 part of barium stearate and 0.5 part of stearic acid were blended in Henschel mixer. Thus obtained blend was extruded into a sheet, which was kept at 180° C. under 200 kg./cm.² for 10 minutes to pressure mold the sheet. The properties of the pressure-molded sheet are shown in Table 2.

EXAMPLES 13-14

Preparation of graft copolymer (G-2)

| | Parts |
|---|---|
| A-1 latex (as solid) | 70 |
| Styrene | 21 |
| Acrylonitrile | 9 |
| Cumene hydroperoxide | 0.036 |
| Dextrose | 0.20 |
| Sodium pyrophosphate | 0.10 |
| Sodium soap of rosin | 0.40 |
| Ferrous sulfate | 0.001 |
| Deionized water | 20 |

The above composition was graft copolymerized at 60° C. for 4 hours to obtain a graft copolymer (G-2).

Preparation of resin (C-2) for blend

| | Parts |
|---|---|
| Styrene | 70 |
| Acrylonitrile | 30 |
| Cumene hydroperoxide | 0.30 |
| t-Dodecyl mercaptan | 0.40 |
| Dextrose | 1.67 |
| Sodium pyrophosphate | 0.87 |
| Sodium soap of rosin | 3.0 |
| Ferrous sulfate | 0.008 |
| Deionized water | 150 |

The above composition was polymerized at 60° C. for 3 hours to obtain a copolymer (C-2) for blend.

Preparation of graft blend type copolymer 100 parts of G-2 latex and 75 parts of C-2 latex were homogeneously mixed in latex form. The mixture was coagulated in diluted sulfuric acid and washed with water and dried to obtain powdery graft-blend type copolymer (GB-3).

Similarly, 100 parts of G-2 latex and 100 parts of C-2 latex were blended to obtain GB-4 using GB-3 or GB-4; resin compositions were prepared as in Example 11. The properties thereof are as shown in Table 2.

TABLE 2

| Example Number | Graft-blend type copolymer | Sharpy impact strength, kg.-cm./cm.$^2$ | Tensile strength, kg./cm.$^2$ | Vicat softening point, °C. |
|---|---|---|---|---|
| 11 | GB-1 | 56.5 | 490 | 84.7 |
| 12 | GB-2 | 25.7 | 510 | 85.2 |
| 13 | GB-3 | 32.5 | 483 | 84.9 |
| 14 | GB-4 | 21.0 | 508 | 85.5 |

The graft-blend type copolymer is preferable because the values of the properties of the compositions caused by the elastomer (A) can be freely changed by freely changing the elastomer content with change of amount of the graft resin.

EXAMPLE 15

Accelerated weathering test was carried out on the resin compositions obtained in Examples 1, 2, 7, 11 to measure Sharpy impact strength. The test of weatherability was also carried out. For comparisons, the results of the composition obtained using 15 parts of vinyl acetate-ethylene-vinyl chloride graft copolymer, chlorinated polyethylene, or MBS resin and the result of polyvinyl chloride resin alone are also shown in Table 3.

As shown in Tables 1, 2, and 3, the compositions of this invention have nearly the same excellent impact resistance, thermal properties, processability, tensile strength, etc. as compositions comprising PVC resin to which, for example, MBS resin was blended, and have extremely superior weatherability to said compositions.

TABLE 3.—WEATHERABILITY (TOYO RIKA CO. LTD. IN JAPAN WE-2 TYPE WEATHEROMETER)

| | Sharpy impact strength (kg.-cm./cm.$^2$) | | | | | |
|---|---|---|---|---|---|---|
| | Original | 100 hrs. exposure | 200 hrs. | 500 hrs. | 1,000 hrs. | Note |
| Example 1 | 65.5 | 65.0 | 57.6 | 60.5 | 25.8 | |
| Example 2 | 68.5 | 65.6 | 64.6 | 57.5 | 52.8 | |
| Example 7 | 21.5 | 21.5 | 20.7 | 19.6 | 18.8 | |
| Example 11 | 56.5 | 52.3 | 51.8 | 51.0 | 46.5 | |
| Comparative Example 5 | 3.1 | 3.1 | 3.1 | 3.1 | 3.0 | Polyvinyl chloride resin. |
| Comparative Example 6 | 11.8 | 10.5 | 10.0 | 9.4 | 7.8 | Vinyl acetate-ethylene-vinyl chloride. |
| Comparative Example 7 | 24.0 | 21.5 | 20.5 | 16.2 | 15.0 | Chlorinated polyethylene. |
| Comparative Example 8 | 51.2 | 15.5 | 4.5 | 3.0 | 2.8 | MBS resin. |

What is claimed is:

1. A polyvinyl chloride resin composition which comprises a mixture of 100 parts by weight of a vinyl chloride polymer and 5 to 80 parts by weight of a resin (I); said resin comprising
   (a) 20 to 80 parts by weight of a core-crust structural crosslinked polyalkyl acrylate elastomer (A) and
   (b) 80 to 20 parts by weight of a polymer (B) obtained by the polymerization of at least one vinyl monomer selected from the group consisting of vinyl mononuclear aromatic hydrocarbons selected from the group consisting of styrene and α-methyl styrene; vinyl cyanides selected from the group consisting of acrylonitrile and methacrylonitrile; lower alkyl acrylates selected from the group consisting of methyl methacrylate, ethylmethacrylate, propylmethacrylate, and butylmethacrylate; lower alkyl vinyl ethers selected from the group consisting of methylvinyl ether, ethylvinyl ether, propylvinyl ether and butylvinyl ether; and lower alkyl vinyl ketones selected from the group consisting of methylvinyl ketone, ethylvinyl ketone, propylvinyl ketone and butylvinyl ketone, at least a part of said vinyl monomer being graft-polymerized in the presence of said elastomer (A); said elastomer (A) being prepared by the steps of:

(1) providing a vinyl monomer having dissolved therein an organic peroxide having a decomposition temperature higher than 60° C., said vinyl monomer comprising:
      (a) 80 to 100% by weight of at least one alkyl acrylate, the alkyl group of which having 1 to 10 carbon atoms, and
      (b) 0 to 20% by weight of a second vinyl monomer selected from the group consisting of vinyl mononuclear aromatic hydrocarbons selected from the group consisting of styrene and α-methyl styrene; vinyl cyanides selected from the group consisting of acrylonitrile and methacrylonitrile; lower alkyl acrylates selected from the group consisting of methyl methacrylate, ethylmethacrylate, propylmethacrylate, and butylmethacrylate; lower alkyl vinyl ethers selected from the group consisting of methylvinyl ether, ethylvinyl ether, propylvinyl ether and butylvinyl ether; and lower alkyl vinyl ketones selected from the group consisting of methylvinyl ketone, ethylvinyl ketone, propylvinyl ketone and butylvinyl ketone;
   (2) polymerizing said vinyl monomer at a temperature below 60° C. in an aqueous solution containing a water soluble redox initiator to obtain an elastomer latex;
   (3) heating and stirring said latex at a temperature higher than 60° C. to obtain a crosslinked elastomer latex corresponding to the core portion of said elastomer (A);
   (4) adding to a latex, containing 100 parts by weight of said crosslinked elastomer, 30 to 150 parts by weight of a vinyl monomer having dissolved therein an oragnic peroxide having a decomposition temperature of higher than 60° C.; said vinyl monomer comprising:
      (a) 80 to 100% by weight of at least one alkyl acrylate, the alkyl group of which has 1 to 10 carbon atoms, and
      (b) 0 to 20% of said second vinyl monomer;
   (5) seed polymerizing said vinyl monomer with a water soluble redox initiator at a temperature below 60° C.; and
   (6) heating the resulting latex to a temperature above 60° C., thereby surrounding the core portion of the elastomer with a crust portion and forming the core-crust structural crosslinked polyalkyl acrylate elastomer (A).

2. A resin composition according to claim 1, wherein said resin (I) is obtained by polymerizing all of the monomer for the polymer (B) in the presence of the elastomer (A).

3. A resin composition according to claim 1, wherein said resin (I) is obtained by mixing a graft polymer (b) obtained by polymerizing a part of monomer for the polymer (B) in the presence of the elastomer (A) with a polymer (C) separately prepared by polymerizing the remaining part of monomer for the polymer (B) in such a manner that the total amount of the polymer (B) component is 80 to 20 parts by weight of the resin (I).

4. A resin composition according to claim 1, wherein said resin (I) is prepared by polymerizing a part of monomer for the polymer (B) in the presence of the elastomer (A) to prepare a graft polymer (b), and then adding and polymerizing the remaining part of monomer for the polymer (B) in the presence of the graft polymer (b).

5. A resin composition according to claim 1, wherein said resin (I) is prepared by polymerizing a part of monomer for the polymer (B) in the presence of the elastomer (A) to prepare a graft polymer (b), adding and polymerizing a part of the remaining monomer for the polymer (B) in the presence of the graft polymer (b) to obtain a graft polymer (c), and then blending the graft polymer (c) with a polymer prepared by separately polymerizing the remaining monomer for the polymer (B).

6. A resin composition according to claim 1, wherein the elastomer (A) is composed of 100 parts by weight of core portion which comprises 80 to 100% by weight of n-butyl acrylate and 0 to 20% by weight of methyl methacrylate and 30 to 150 parts by weight of crust portion which comprises n-butyl acrylate, and the monomer for the polymer (B) contains at least one member selected from methyl methacrylate, styrene and acrylonitrile.

7. A resin composition according to claim 1, wherein the monomer for the elastomer (A) comprises a monomer which comprises 80 to 100% by weight of at least one member selected from n-butyl acrylate and 2-ethylhexyl acrylate and 0 to 20% by weight of methyl methacrylate.

8. A resin composition according to claim 1, wherein the oragnic peroxide is benzoyl peroxide and the amount thereof is 0.3 to 3.0% by weight based on the weight of the monomer for the elastomer (A).

9. A resin composition according to claim 1, wherein the organic peroxide is selected from the group consisting of lauroyl peroxide, octanoyl peroxide, cyclohexanone peroxide, benzoyl peroxide, p-chlorobenzoyl peroxide, dicumyl peroxide, and di-tertiary butyl peroxide.

10. A resin composition according to claim 1, wherein the redox catalyst used is selected from the group consisting of potassium persulfate-sodium bisulfite, potassium persulfate-sodium thiosulfate and ammonium persulfate-sodium bisulfite.

11. A resin composition according to claim 1, wherein the vinyl chloride polymer is selected from the group consisting of vinyl chloride, copolymers mainly composed of vinyl chloride, chlorinated polyvinyl chloride and chlorinated copolymers mainly composed of vinyl chloride, and has a mean degree of polymerization of 500 to 2,000.

References Cited

UNITED STATES PATENTS

| | | | |
|---|---|---|---|
| 3,426,101 | 2/1969 | Ryan et al. | 260—876 |
| 3,562,235 | 2/1971 | Ryan | 260—876 X |
| 3,502,604 | 3/1970 | Nakatsuka et al. | 260—885 X |

FOREIGN PATENTS

| | | | |
|---|---|---|---|
| 1,117,124 | 6/1968 | Great Britain | 260—885 |

MURRAY TILLMAN, Primary Examiner

H. W. ROBERTS, Assistant Examiner

U.S. Cl. X.R.

260—29.6 RB, MQ, 881, 885